United States Patent [19]

Miyazaki et al.

[11] Patent Number: 5,586,334
[45] Date of Patent: Dec. 17, 1996

[54] APPARATUS AND METHOD FOR SUSPENDING AND RESUMING SOFTWARE ON A COMPUTER

[75] Inventors: Masaya Miyazaki, Ikeda; Nobuyuki Enoki, Kadoma; Mitsuaki Morita, Hirakata, all of Japan

[73] Assignee: Matsushita Electric Industrial Co., Ltd., Osaka, Japan

[21] Appl. No.: 376,097

[22] Filed: Jan. 20, 1995

Related U.S. Application Data

[63] Continuation of Ser. No. 896,131, Jun. 9, 1992, abandoned.

[30] Foreign Application Priority Data

Jun. 10, 1991 [JP] Japan .................. 3-137486

[51] Int. Cl.⁶ .................................. G06F 1/26
[52] U.S. Cl. ........................................ 395/750
[58] Field of Search .................... 395/750, 575

[56] References Cited

U.S. PATENT DOCUMENTS

| | | | |
|---|---|---|---|
| 3,959,778 | 5/1976 | Brette | 395/575 |
| 4,096,560 | 6/1978 | Footh | 395/575 |
| 4,458,307 | 7/1984 | McAnlis et al. | 395/575 |
| 4,907,150 | 3/1990 | Arroyo et al. | 395/750 |
| 4,994,934 | 2/1991 | Bouhenguel | 361/71 |
| 5,167,024 | 11/1992 | Smith et al. | 395/750 |
| 5,218,607 | 6/1993 | Saito et al. | 295/75 |
| 5,276,890 | 1/1994 | Arai | 395/750 |
| 5,339,444 | 8/1994 | Nakajima | 395/750 |
| 5,375,230 | 12/1994 | Fujimori | 395/575 |
| 5,392,438 | 2/1995 | Gunji | 395/750 |

FOREIGN PATENT DOCUMENTS

| | | |
|---|---|---|
| 0230351 | 8/1987 | European Pat. Off. . |
| 0365128 | 9/1989 | European Pat. Off. . |
| 92007321 | 1/1991 | European Pat. Off. . |
| 9207321 | 4/1992 | WIPO . |

OTHER PUBLICATIONS

Toshiba T1600 Portable Personal Computer User's Manual, Sep. 1988.
Elektor Electronics, vol. 9, No. 12, Dec. 1983, Canterbury, Great Britain, pp. 12.58–12.61, 'NOVRAM: Data Storage without batteries'.
Book Computer J–3100SS002 DynaBook/DynaBook Guide, Jun. 22, 1990.

*Primary Examiner*—Ayaz R. Sheikh
*Attorney, Agent, or Firm*—Price, Gess & Ubell

[57] ABSTRACT

There is disclosed a control unit of a computer system comprising a volatile storing device for holding written data while the power is on, a non-volatile storing device for holding the written data even when the power is off, and a power-off preserving device for powering off after transferring the data held in the volatile storing device to the non-volatile storing device. The control unit of the computer system further comprising a power-on resuming device for returning the data held in the non-volatile storing device to the volatile storing device. There is also disclosed a control unit of a computer system comprising a non-resumable condition judging device for judging whether the status of the computer system meets the process non resumable condition or not when the powering off operation is directed, and a non-resumable condition informing device for informing the user that the status has been judged to meet the condition.

15 Claims, 17 Drawing Sheets

Fig. 1
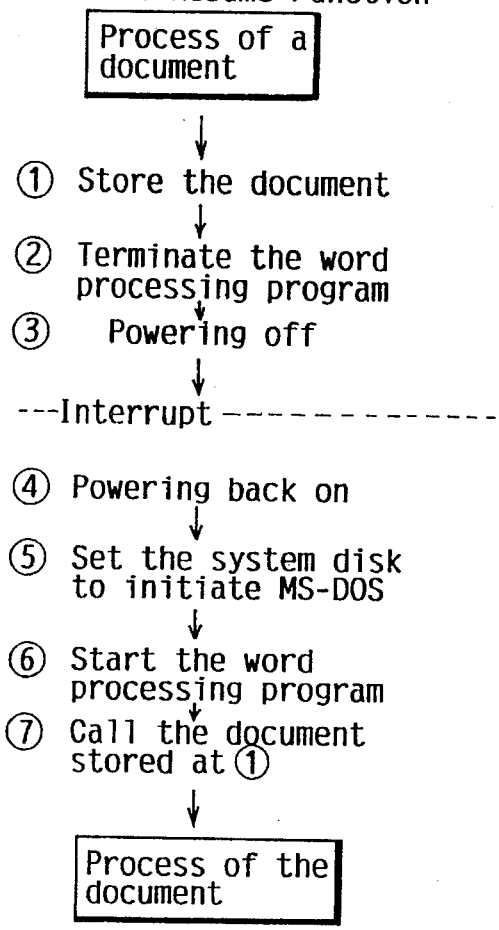
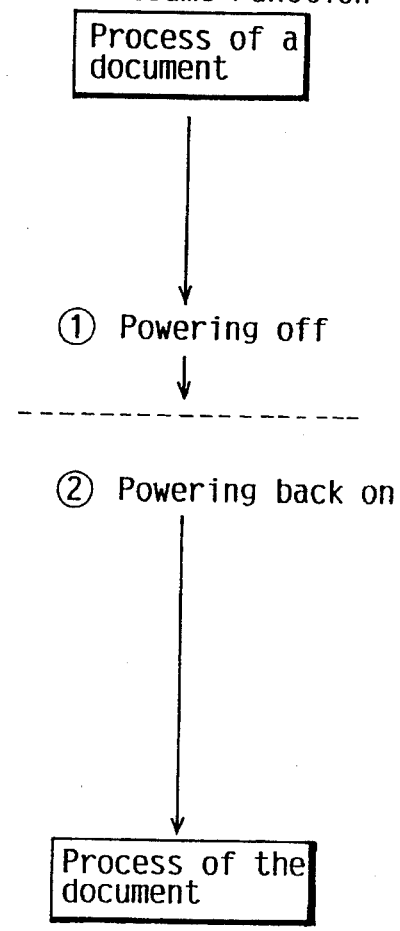

Fig. 14

| protocol | source address field | destination address | connecting condition |
|---|---|---|---|
| TCP | X. A | X. B | completed |
| TCP | X. C | Y. A | completed |
| TCP | X. D | X. E | being connected |
| ⋮ | ⋮ | ⋮ | ⋮ |

judgement table : communication status table conditions : protocol = TCP
destination address = X
connecting conditions = completed

APPARATUS AND METHOD FOR SUSPENDING AND RESUMING SOFTWARE ON A COMPUTER

This is a continuation of application Ser. No. 07/896,131, filed on Jun. 9, 1992, now abandoned.

BACKGROUND OF THE INVENTION

(1) Field of the Invention

This invention relates to a method and apparatus for suspending and resuming the execution of an application program during a power off/on cycle, which are applied to computer systems such as personal computers and workstations.

(2) Description of the Related Art

In former computer systems, memory or registers provided to the systems could not hold data once the systems were powered off so that the previous status could not be resumed even the systems were powered back on, if the power was turned off during the execution of a program.

Therefore, the user, when desired to power off during the operation and to restart it at a later time, needed the operations as shown in FIG. 1 (*a*) and in the following, before powering off and after powering back on.

(Before powering off)

(1) Store the document being processed into a floppy disk (2) Terminate the execution of the word processing program (After powering back on)

(3) Set the floppy disk and start the operating system from the beginning (for example, MICRO SOFT MS-DOS)

(4) Start the word processing program (5) Retrieve the stored document to process Some of the recently developed portable personal computers named book type or notebook type have the function called resume function. This enables the user to restart his operation at the exact execution point at which it is suspended during a power off operation, thereby bypassing the above procedure. All the user have to do is to power off/on at any desired point as shown in FIG. 1(*b*).

Toshiba "DynaBook guide" says such a function is implemented by employing a battery built in the personal computer.

Such a personal computer seems to have a construction shown in FIG. 2 where a power unit 5006 having a battery 5008 is connected with an external power unit 5007 and a power switch 5112, and supplies power to a control board 5001, an display device 5105, an input device 5106, and an external storage unit 5005. The control board 5001 mounts a Central Processing Unit (CPU) 5101, a memory 5102, a display control unit 5002, an external storage controller 5003, and an input control unit 5004 thereon.

When the power switch 5112 is on, the power unit 5006 is supplied power from the external power unit 5007, and supplies the power to each unit of the personal computer and charges the battery 5008. If there is no supply from the external power unit 5007 (for example, not connected), it supplies power from the battery 5008 to each unit.

In contrary, when the power switch 5112 is off, the power unit 5006 supplies power from the battery 5008 only to the control board 5001 whether or not it is supplied power from the external power unit 5007. During the time, the entire operation of the personal computer looks in the stopped state with no display on the display device 5105 and no operation in the external storage unit 5005.

However, such data necessary to resume the execution of a program which was running at the time it was powered off as those stored in the memory 5102 or registers in the CPU 5101 is retained even after the switch 5112 has been turned off because the control board 5001 is supplied power from the battery as mentioned.

When the user turns on the power switch 5112 again at a later time, the display device 5105, the input device 5106, and the external storage unit 5005 are supplied power by the power unit 5006, and the unit 5005 and other units are initialized. Consequently, the previous screen is again displayed on the display device 5105 based on the graphic data stored in the memory 5102, for example, thus, the status before the powering off operation is resumed, thereby, enabling the user to restart his operation.

Some of the Large Scale Integrated Circuits (LSIs) which are recently used as a CPU, a memory, or a control unit for an external unit have a mode called low power mode or sleeping mode in which the LSIs do not operate actively but just holds data by consuming just a small amount of power. Such LSIs can be used to more easily extend the period of time that data is retained after powering off operation, by using them in the low power mode after the powering off, and in the normal power mode after the powering back on.

Disclosed in U.S. Pat. No. 4,907,150 and others is a construction in which data stored in a memory or registers in the CPU is transferred to another memory backed up by a battery though the power supply to the CPU or the memory is stopped by powering off. According to this approach, it becomes easier to select a high-speed or compact device as CPU or memory, without considering power demand.

However, any of the computer system having the above construction needs batteries, thereby making it difficult to realize both reducing the product cost, weight, and size of the apparatus, and extending the capacity of the battery to retain the status in which the previous operation can be resumed.

Furthermore, the construction can not be applied to high-speed computer systems such as workstations, because they have large power demand and many of the LSIs used for them do not have the above mentioned low power mode. Therefore, for example, a battery having the capacity to retain a resumable status of a personal computer for a week can retain that of a workstation only for an hour. Also, such computer systems having a large capacity of memory would require a large amount of power to retain the entire data in the low-demand memory to be transferred.

Limited resumable period of time gives a great restriction to the practical operations of workstations and other systems because they are mainly for business use so that it causes a severe damage to the users to lose stored data.

Another disadvantage is that some programs can not be restarted their operations even the system has returned to the previous status once the power is off. For example, in a program to communicate with another computer system, the opposite party cancels the communication at the time the powering off operation, where the resume function which unconditionally powers off, has a reverse effect to a smooth operation.

SUMMARY OF THE INVENTION

An object of this invention is to provide a method and apparatus capable of suspending and resuming a software application running on a computer system during a power off/on cycle with no limit of the power off period, and of selecting devices such as a CPU applied to the computer system even without a low power mode, thereby, reducing the size, weight, and producing cost of the computer system.

The above object is achieved by a control unit of a computer system comprising a volatile storing device for holding written data while the power is on, a non-volatile storing device for holding the written data even when the power is off, and a power-off preserving device for powering off after transferring the data held in the volatile storing device to the non-volatile storing device.

The non-volatile memory may be a hard disk drive, an electrical erasable programmable read-only memory, or magneto-optic disk drive.

According to the above construction, the data in the volatile memory device held before the powering off operation is retained without consuming any power so that the previous status where it was before the powering off can be resumed at the powering on operation regardless of the time period of power-off. Moreover, it becomes easier to reduce the size, weight, and producing cost of the computer system.

Another object of this invention is to provide a method and apparatus capable of preventing unconditional powering off operation when the valid execution of the running program can not be resumed even the computer system has returned to the previous status.

The above object can be achieved by a control unit of a computer system comprising a process resuming device for resuming the execution of a program which was running before the powering off operation by resuming the previous contents in memory device containing registers in CPU, registers in input/output units, and volatile memory there were before the powering off operation, a system status holding device for holding information indicating the status of the computer system, a non-resumable condition holding device for holding non-resumable condition according to which the previous process substantially can not be resumed once the power is off, even the stored contents in the memory device has been resumed at powering back on, a non-resumable condition judging device for judging whether the status of the computer system meets the process non resumable condition or not when the powering off operation is directed, and a non-resumable condition informing device for informing the user that the status has been judged to meet the condition.

The above object can be achieved also by a control unit of a computer system comprising the steps of resuming the execution of a program which was running before the powering off operation by resuming the previous status of registers in CPU, registers in input/output units, and the stored contents in memory device containing volatile memory where they were before the powering off operation, judging whether the status of the computer system is in the non-resumable condition or not when the powering off operation is directed, and informing the user that the status has been judged to meet the condition in the previous step.

According to the above construction, the user can know whether the computer system is in the non-resumable status or not at the time of the powering off operation.

The above object can be achieved also by a control unit of a computer system further comprising a power-off direction confirming device for confirming the user to admit to power off when the computer system has been judged to meet the non-resumable condition by the non-resumable condition judging device, for powering off when he does, and for cancelling the power off direction when he does not.

The above object can be achieved also by a control method of a computer system further comprising the steps of confirming the user to admit to power off when the computer system has been judged to be in the non-resumable condition in the step of judging whether the status of the computer system is in the non resumable condition or not, powering off when he does, and cancelling the power off direction when he does not.

According to the above construction, the operator also can select whether the system is powered off or not.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 (a)(b) shows examples of the operation of the user depending on the existence and nonexistence of the resume function of a computer system.

FIG. 14 is an example of the communication status table of Embodiment 2.

FIG. 15 is an example of the non-resumable condition of Embodiment 2.

DESCRIPTION OF THE PREFERRED EMBODIMENT

<Embodiment 1>

(The Construction of the Hardware)

Figure 2:
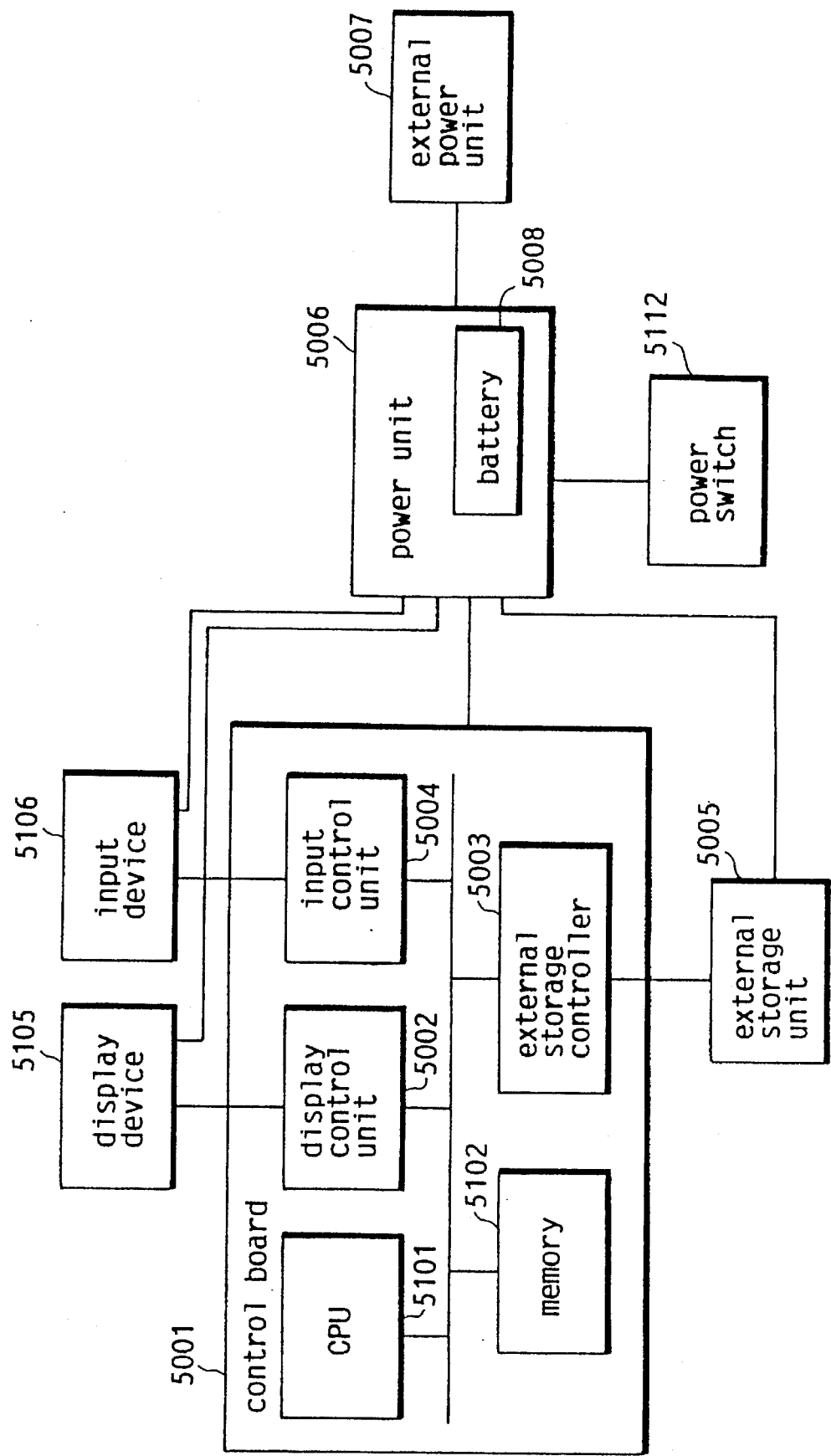
FIG. 2 is a block diagram of the surmised hardware construction of a conventional computer system.
Figure 3:
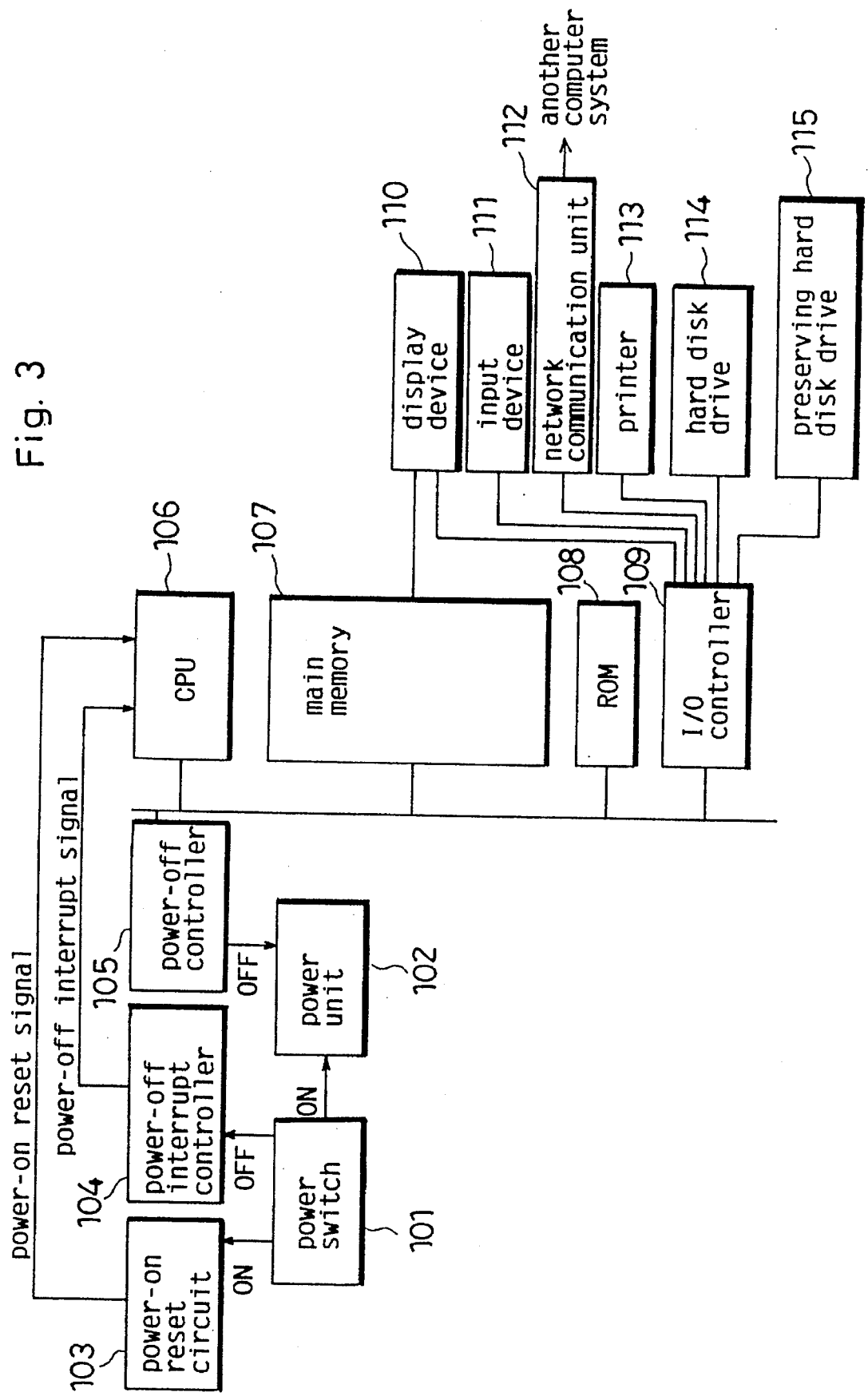
FIG. 3 is a block diagram of the hardware construction of the computer system of Embodiment 1.

The computer system of this embodiment is, as shown in FIG. 3, provided with a power switch 101, a power unit 102, a power-on reset circuit 103, a power-off interrupt controller 104, and a power-off controller 105.

The power switch 101 does not connect or disconnect the power line directly, but outputs on/off signals according to directions. The power unit 102 supplies power to each unit of the system when inputted the on-signal from the power switch 101, and stops the supply when inputted the off-signal from the power-off controller 105.

A CPU 106 is inputted both a power-on reset signal outputted from the power-on reset circuit 103 and a power-off interrupt signal outputted from the power-off interrupt controller 104. The computer system is also provided with a memory 107, a ROM 108, and an I/O controller 109 all of which, the power-off controller 105 and the CPU 106 being connected with each other via bus lines.

The I/O controller 109 controls a display device 110, an input device 111, a network communication unit 112, a printer 113, a hard disk drive 114, and a preserving hard disk drive 115 to carry out data input/output operation among these units. The graphic data to display images on the display device 110 is directly inputted from the memory 107. The I/O controller 109 is provided with internal registers including a baud rate register for holding information indicating the communication speed with the input device 111, and a Hard Disk (HD) transfer mode register for holding information indicating the data is transferred to/from the hard disk drive 114 on synchronous mode or another.

(The Construction of a Register Set in CPU 106)

Figure 4:
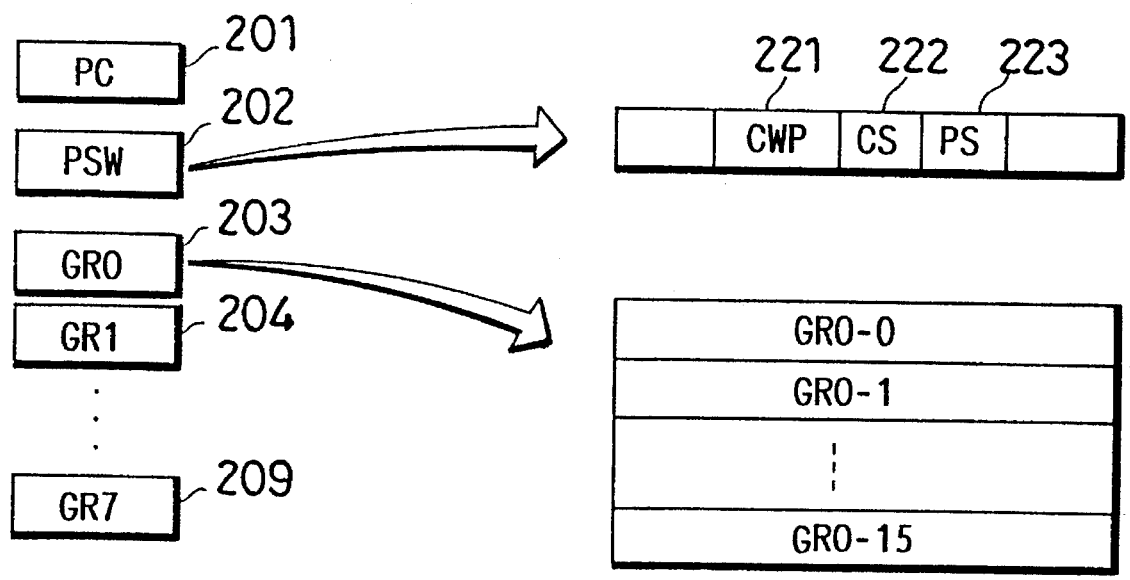
FIG. 4 is an illustration showing the construction of the register set in the CPU of Embodiment 1.

The CPU 106 is, as shown in FIG. 4, provided with a program counter (PC) 201, a resister for a processor status word (PSW) 202, general purpose register groups (GR) 203–209 each of which consists of 16 registers. The PSW 202 includes these fields holding a current window pointer (CWP) 221 indicating the GR in use among the GR 203–209, holding a current status (CS) 222 indicating the current mode status of the CPU 106, and holding a previous status (PS) 223 indicating the mode status of the CPU 106 at the time an interruption has occurred. The above mode status includes a supervisor mode in which the execution of privileged instructions or memory accesses associated with the system control is allowed, and a user mode in which the execution is not.

(The Memory Map of the Memory 107)

Figure 5:
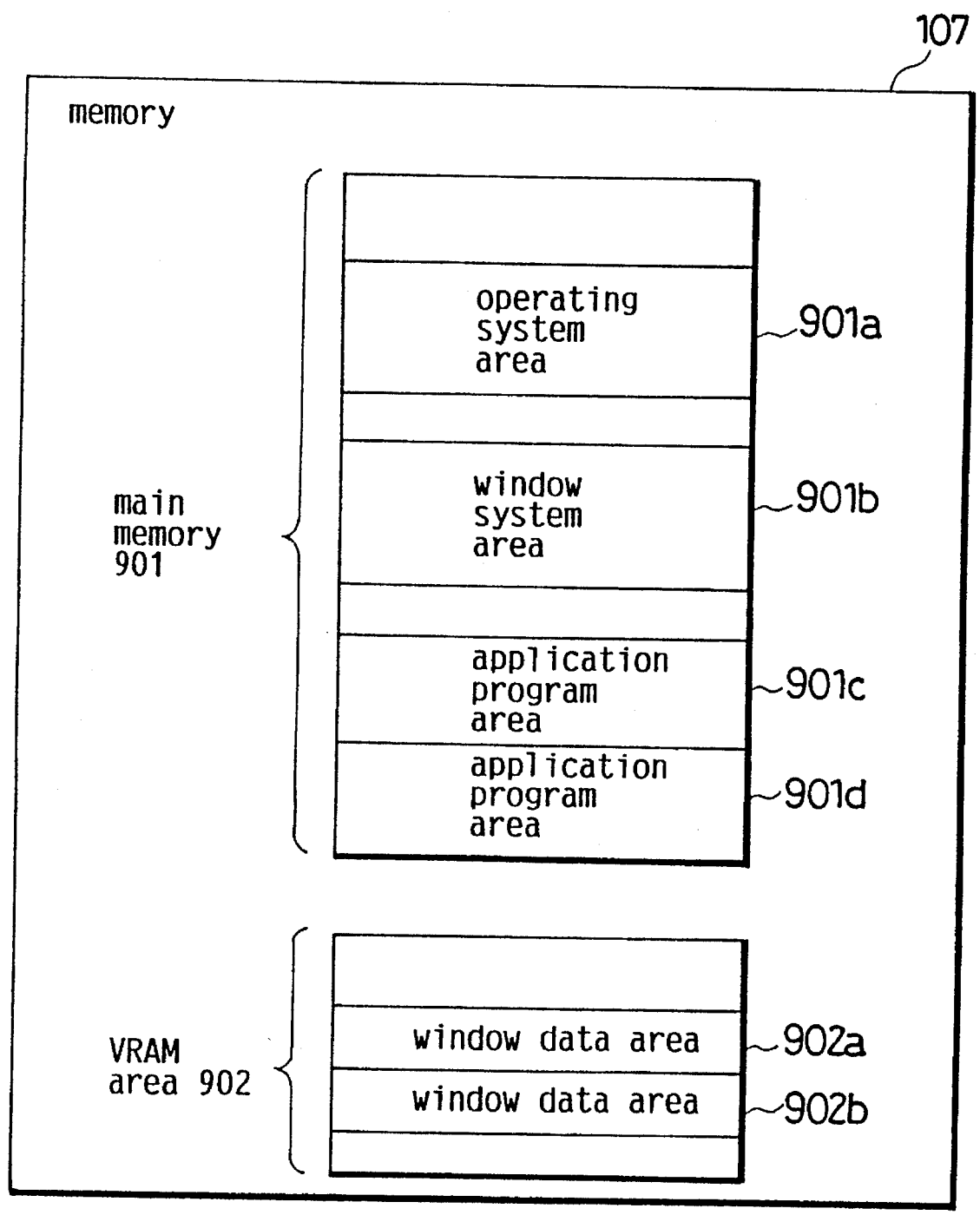
FIG. 5 is an example of the memory map of the memory of Embodiment 1.

In the memory 107 consisting of a RAM, a main memory 901 and a VRAM area 902 are reserved as shown in FIG. 5.

The main memory 901 includes an operating system area 901a, a window system area 901b, and an application program areas 901c/901d. . . . In the operating system area 901a, operating system programs, a memory management table for managing the use of the memory 107, a process control table for managing the status of a running program and the like are stored. In the window system area 901b, window system programs, various data including the number of the windows opened or indicated on the display device 110, the sizes and positions of each window are stored. In the VRAM area 902, window data areas 902a/902b . . . and the like holding the graphic data of the images displayed on a window and the like are reserved when the window is opened.

(The Functional Construction of the Program Routine)

The computer system operates by the execution of the program routine stored in the memory 107 or the ROM 108. This routine is divided into functional units to make the description easier.

Figure 6:
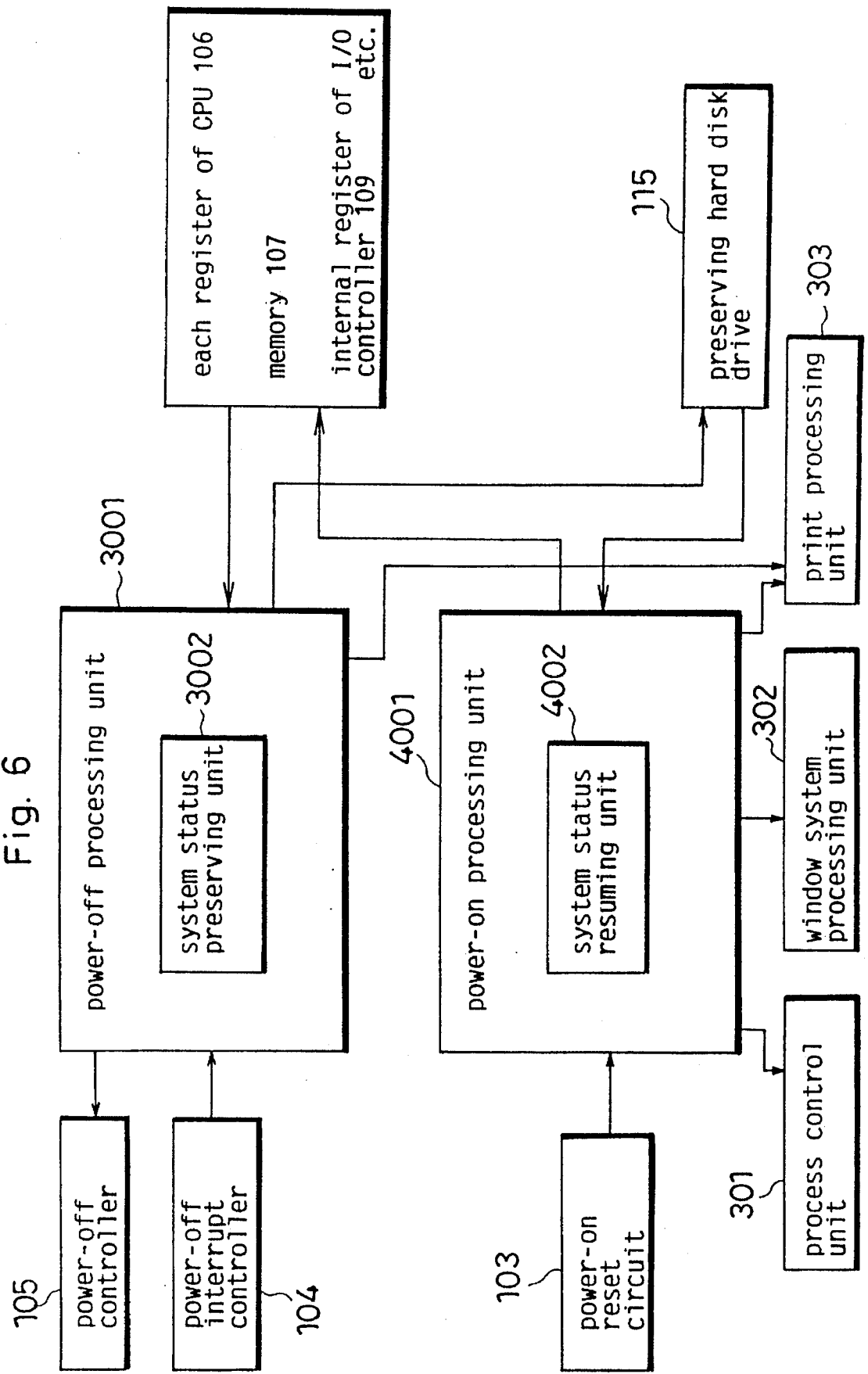
FIG. 6 is a block diagram showing the functional construction of the program routine of Embodiment 1.

As shown in FIG. 6, a power-off processing unit 3001 is initiated by the input of a power-off interrupt signal from the power-off interrupt controller 104, and directs the power-off controller 105 to output a power-off signal after a system status preserving unit 3002 has stored the data held in each register of the CPU 106, the memory 107, the internal registers of the I/O controller 109, or the like to the preserving hard disk drive 115. The unit 3001 also sends control information to a print processing unit 303 which controls the printing operation of the printer 113 to avoid the troubles caused by powering off during the printing process.

A power-on processing unit 4001 is initiated by the input of a power-on reset signal from the power-on reset circuit 103, and transfers control to the routine which was running at the time the powering off operation, after a system status resuming unit 4002 has set the data stored in the preserving hard disk drive 115 to each of the registers in the CPU 106 and another unit. The unit 4001 also sends, if necessary, control information to a process control unit 301 for managing the process of an application program in execution, to a window system processing unit 302 for managing the window displayed on the display device 110, and to the print processing unit 303 in order to avoid the troubles caused from the exact resuming of the status where it was before the powering off.

The description of the other units is omitted because they are the same as those provided in the conventional computer systems. They include the following units: a boot processing unit for activating the system at the time the powering on without resuming the data saved to the preserving hard disk drive 115, an initializing processing unit for initializing the I/O controller 109 and the like, an operating system processing unit for executing an operating system program, an application processing unit generated by loading an application program.

The operation of the computer system having the above construction is described as follows.

(Interrupt Operation)

Interrupt operations are closely related with the operation of the power-off processing unit 3001 and the power-on processing unit 4001. They are initiated by the input of an interrupt signal such as the power-off interrupt signal to the CPU 106 or by the execution of a software interrupt instruction.

When an interruption has occurred, the CPU 106 performs the following internal procedure before transferring control to the interrupt processing program.

(1) Shift the GR in use by incrementing the value of the CWP 221 for the interrupt processing program in order to save the value of each register of the GR used before the interruption.

(2) Save the value of the PC 201 at the point of the interruption occurrence which indicates the address of the area in which the instruction to be fetched next is preserved by moving, for example, to the 16th register of the GR indicated by the CWP 221. The value of PC 201 may be pushed to a stack.

(3) Move the value of the CS 222 to the PS 223, and transfer control to the interrupt processing program. More precisely, the CPU 106 sets the execution starting address of the interrupt processing program predesignated according to the types of the interrupt signals or the like to the PC 201 and executes the interrupt processing program by the instruction stored in the address area.

The process which was being executed before the interruption occurrence is resumed by the execution of the interrupt returning instruction in the interrupt processing program.

The CPU 106 carries out the following internal procedure to return to the status where it was before the interruption occurrence.

(1) Move the value of the PS 223 back to the CS 222 to retrieve its original value (the mode of the CPU is returned to the original).

(2) Move the address stored in the 16th register of the GR indicated by the CWP 221 to the PC 201.

(3) Decrement the value of the CWP 221 so that the GR used before the interruption occurrence can be used.

Thus, the CPU 106 returns to the previous status where it was before the interruption occurrence and resumes the execution according to the instructions stored in the address area indicated by PC 201.

(The Operation Performed Subsequent to the Powering On When the Status of the System is Not Preserved)

The computer system of this embodiment can be powered off even without preserving the system status as described later.

Figure 7:
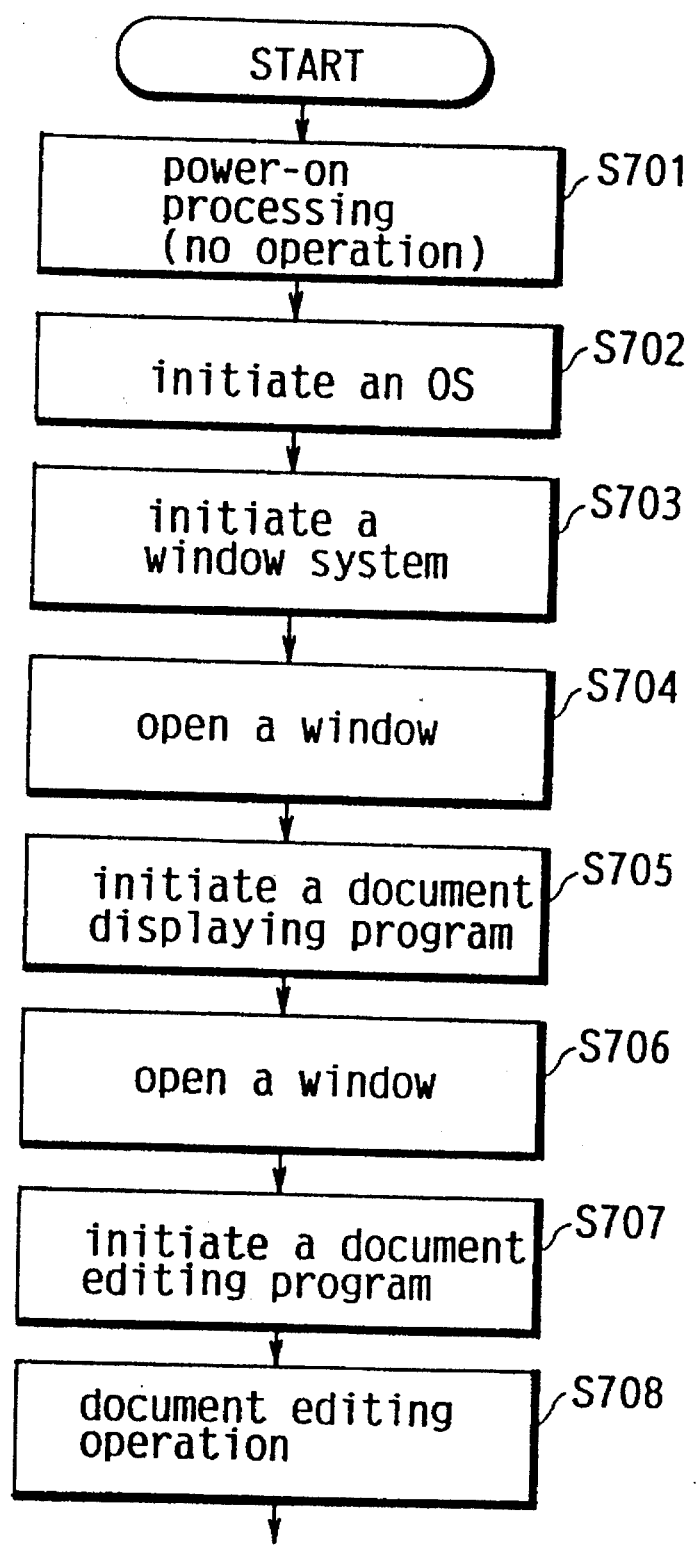
FIG. 7 is a flow chart depicting the operation performed at the powering on when the system status of Embodiment 1 is not preserved.

The operation of displaying and editing a document at the powering back on at a later time is described with reference to FIG. 7.

By turning the power switch 101 on, the power-on reset circuit 103 outputs a power-on reset signal, and the power-on processing unit 4001 is initiated (S701). The unit 4001 transfers control to the boot processing unit without initiating the system status resuming unit 4002 after confirming that the system status was not preserved in the preserving hard disk drive 115 at the previous powering off operation by checking the value of a resumable flag 601 stored in the drive 115 as described later. The boot processing unit initializes the I/O controller 109 and other units by initiating the initializing processing unit, loads the operating system program from the hard disk drive 114 to the operating system area 901a, and transfers control to the operating system processing unit (S702). At this time, the operating system processing unit accepts input operation of the user.

According to the direction of the user to initiate the window system, the operating system processing unit loads the window system program to the window system area 901b to initiate the window system processing unit 302 (S703).

Figure 8:
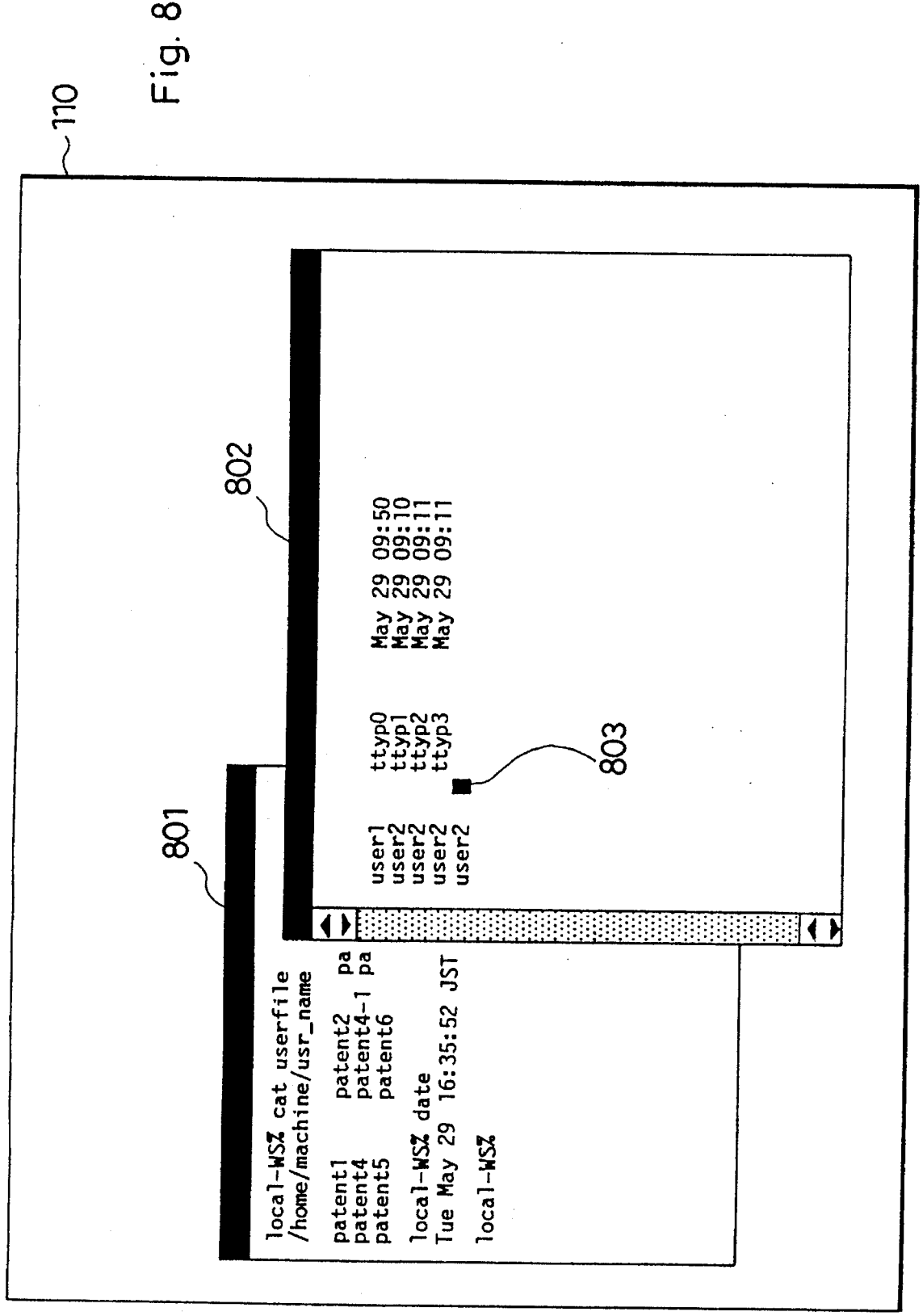
FIG. 8 is an illustration showing an example of the display on the display device of Embodiment 1.

According to the direction of the user to open a window, the window system processing unit 302 displays a window 801 as shown in FIG. 8 (S704). At this time, the unit 302 stores the data including the position and size of the window 801 into the window system area 901b, and reserves a window data area 902a holding the graphic data of the images displayed on the window 801 in the VRAM area 902.

According to the direction of the user to initiate a document display program within the window 801, the operating system processing unit reserves an application program area 901c, and loads the application program from the hard disk drive 114 in order to initiate the application processing unit (S705). According to the direction of the user to display a document preserved in the hard disk drive 114 before, the application processing unit displays the document within the window 801 by writing the graphic data to the window data area 902a.

According to the direction of the user to open another window, the window system processing unit 302 displays the window 802 in the same manner as (S704), stores the data including the position and size of the window 802 into the window system area 901b, and reserves the window data area 902b holding the graphic data of the images displayed on the window 802 in the VRAM area 902 (S706).

According to the direction of the user to initiate a document editing program within the window 802, the operating system processing unit reserves an application program area 901d in the same manner as the (S705), loads an application program from the hard disk drive 114, and initiates the application processing unit (S707).

According to the various directions of the user to edit a new document with reference to the document displayed on the window 801, the application processing unit processes the document edition, and displays it on the window 802 (S708) by writing the graphic data to the window data area 902b.

A curser 803 appeared on the window 802 in FIG. 8 indicates the displaying position of a character inputted from the input device 111.

(The Operation Performed Before Powering Off with Preserving the System Status)

Figure 9:
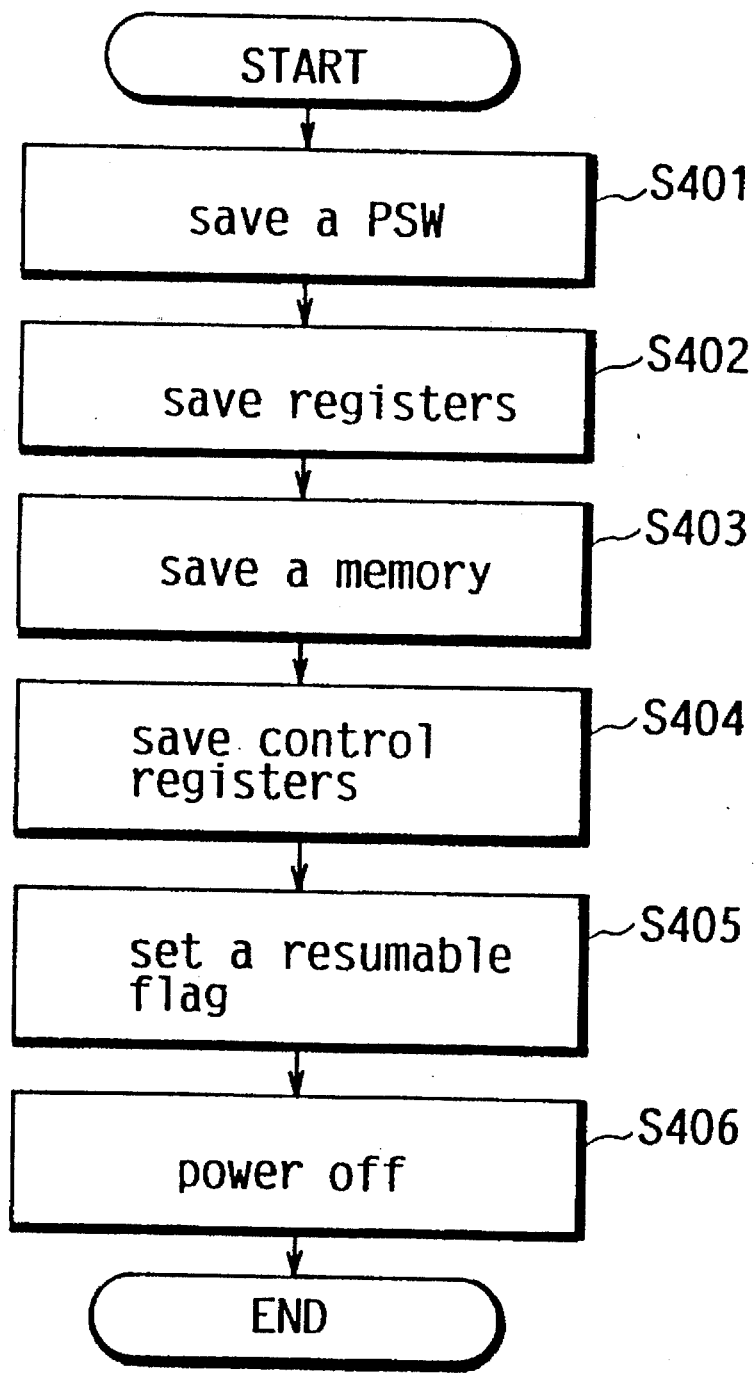
FIG. 9 is a flow chart depicting the operation performed at the powering off after the system status of Embodiment 1 has been preserved.

As shown in FIG. 9, when the power switch 101 is turned off, the power-off interrupt controller 104 outputs a power-off interrupt signal, by which the power-off processing unit 3001 is initiated as interrupt processing as described before, regardless of the status of the application program or the like, and starts the system status preserving unit 3002.

Figure 10:
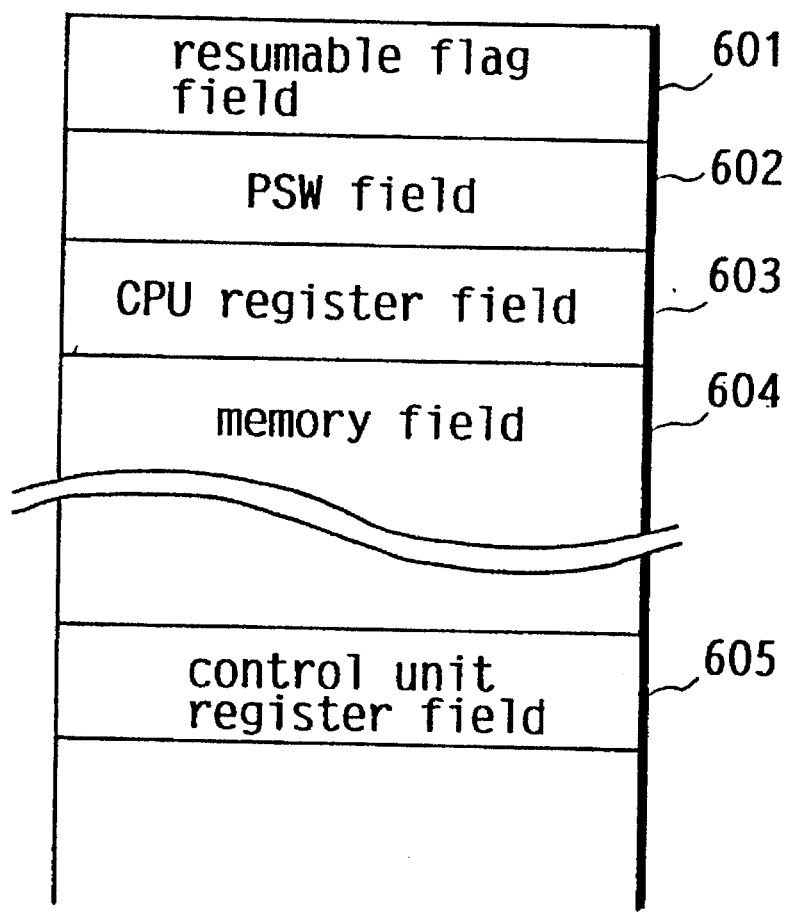
FIG. 10 is an illustration showing the memory map of the preserving hard disk of Embodiment 1.
Figure 11:
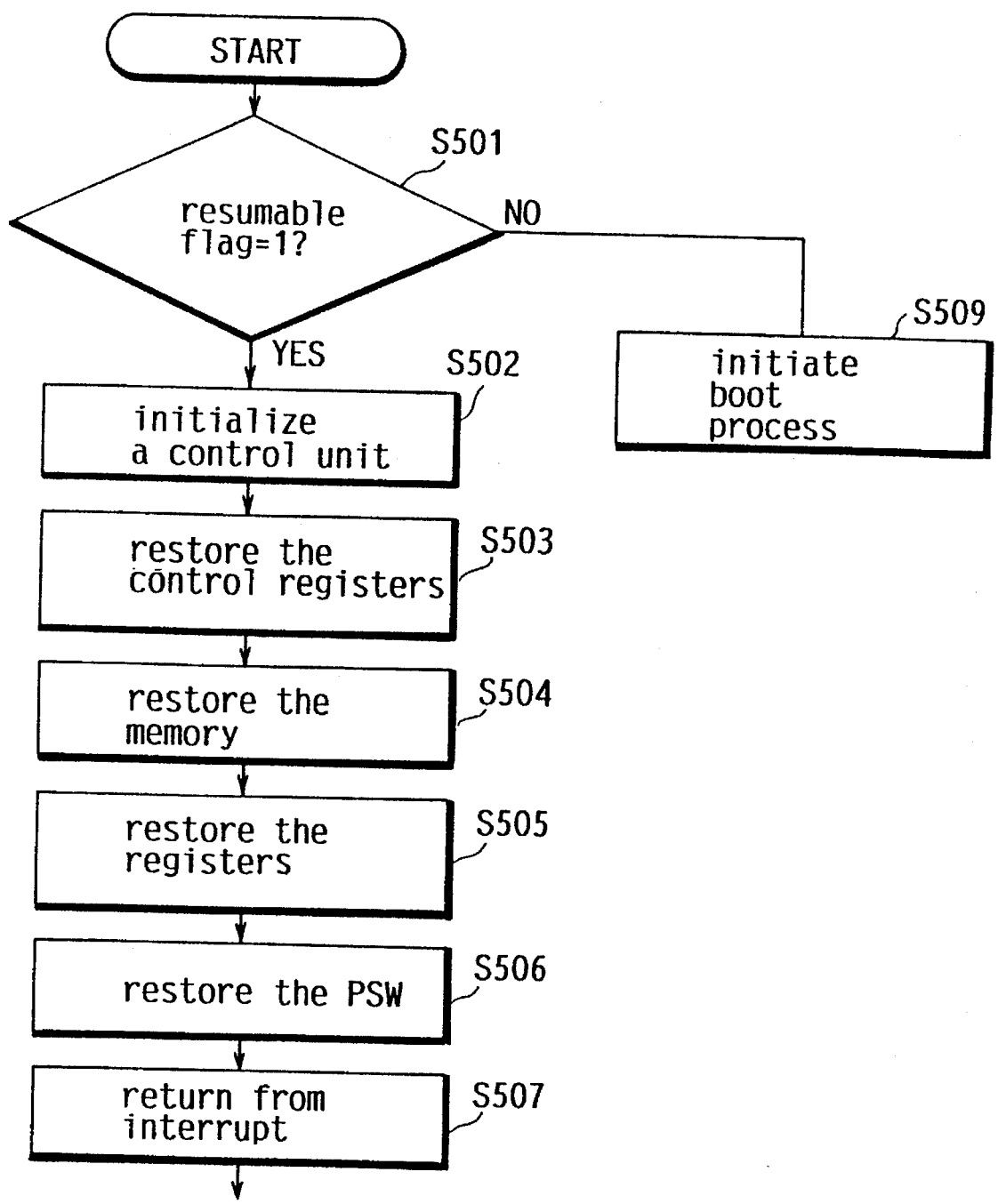
FIG. 11 is a flow chart depicting the operation performed at the powering on when the system status of Embodiment 1 is preserved.

The unit 3002 preserves the contents of the PSW 202 of the CPU 106 to the PSW field 602 of the preserving hard disk drive 115 shown in FIG. 10 (S401), and the contents of the GRs 203–209 to the CPU register field 603. The address in the PC 201 is not stored because it is not needed to resume the system status. The address to be set in the PC 201 to resume the system status where it was before the powering off is held in the 16th register of GR by the internal procedure performed at the time of interruption occurrence.

Next, the unit 3002 stores all the contents of the memory 107 to the memory field 604 (S403). Only effective contents in the areas reserved by operating system processing unit, application processing unit or the like may be designed to be stored to the preserving hard disk drive 115 with reference to the memory control table held in the operating system area 901a.

The unit 3002 also stores the data necessary to resume the system status among those held in the internal register in the I/O controller 109 or the like to the control unit register field 605 (S404).

Later, the unit 3002 sets the value of the resumable flag field 601 to 1 in order to indicate that the system status is preserved, and returns control to the power-off processing unit 3001.

The unit 3001 directs the power-off controller 105 to output a power-off signal. The power-off controller 105 outputs it to the power unit 102 which accordingly stops power supply to each unit of the computer system (S406).

(The Operation Performed Subsequent to the Powering On When the System Status is Preserved)

As shown in FIG. 8, when the power switch 101 is turned on, it outputs a power-on signal to the power unit 102 and to the power-on reset circuit 103. The power unit 102 supplies power to each unit of the system. The power-on reset circuit 103 outputs a power-on reset signal to initiate the power-on processing unit 4001.

The unit 4001 first judges whether the value set in the resumable flag field 601 is 1 or not (S501).

If it is not, the unit 4001 passes control to the boot processing unit without starting the system status resuming unit 4002, and loading of the operating system program and the like is performed as described before (S509).

If it is 1, the unit 4001 first initiates the initializing processing unit to initialize the I/O controller 109 and the like (S502).

Then, the unit 4001 passes control to the system status resuming unit 4002 which subsequently reads the contents preserved in the control unit resister field 605 of the preserving hard disk drive 115 in order to set them in the appropriate internal register of the I/O controller 109 or the like (S503).

The system status resuming unit 4002 reads the contents preserved in the memory field 604 to store them to the memory 107 (S504). Since the window system area 901b and the window data areas 902a/902b are resumed at this time, the display device 110 reads graphic data from the memory 107 and displays the previous images which were being displayed before the powering off.

The unit 4002 subsequently reads the contents of the GRs 203–209 stored in the CPU register field 603 and sets them to the corresponding GRs 203–209 (S505).

The unit 4002 next reads the contents of the PSW 202 stored in the PSW field 602, sets them to the PSW 202 (S506) and returns control to the power-on processing unit 4001.

At this point, all the status except the address indicated by the PC 201 return to the previous status where it was during the power-off processing unit 3001 being performing interrupt process at the powering off. By the execution of return from interrupt instruction in the power-on processing unit 4001, the computer system returns to the previous status where it was before the power-off interrupt signal is inputted, thus, the execution such as application processing is resumed (S507).

Thus, the data necessary for resuming the system status including the contents of the PSW 202 and GRs 203–209, the contents of the memory 107, the contents of the internal register of the I/O controller 109 are stored to the preserving hard disk drive 115 there were before the powering off, and are read therefrom to be set to the registers and the like, thereby, resuming the previous operation which was running before the powering off.

Since the preserving hard disk drive 115 preserves data without power supply, there is not limit of the time period before the next powering on. For obtaining the same effects, a non-volatile memory such as an electrically erasable PROM (EEPROM) and a flash memory, a magneto-optic disk drive, and a magnetic tape drive can be used instead of a hard disk drive.

(The Operation Performed Before Powering Off When the System Status is Not Preserved)

Figure 12:
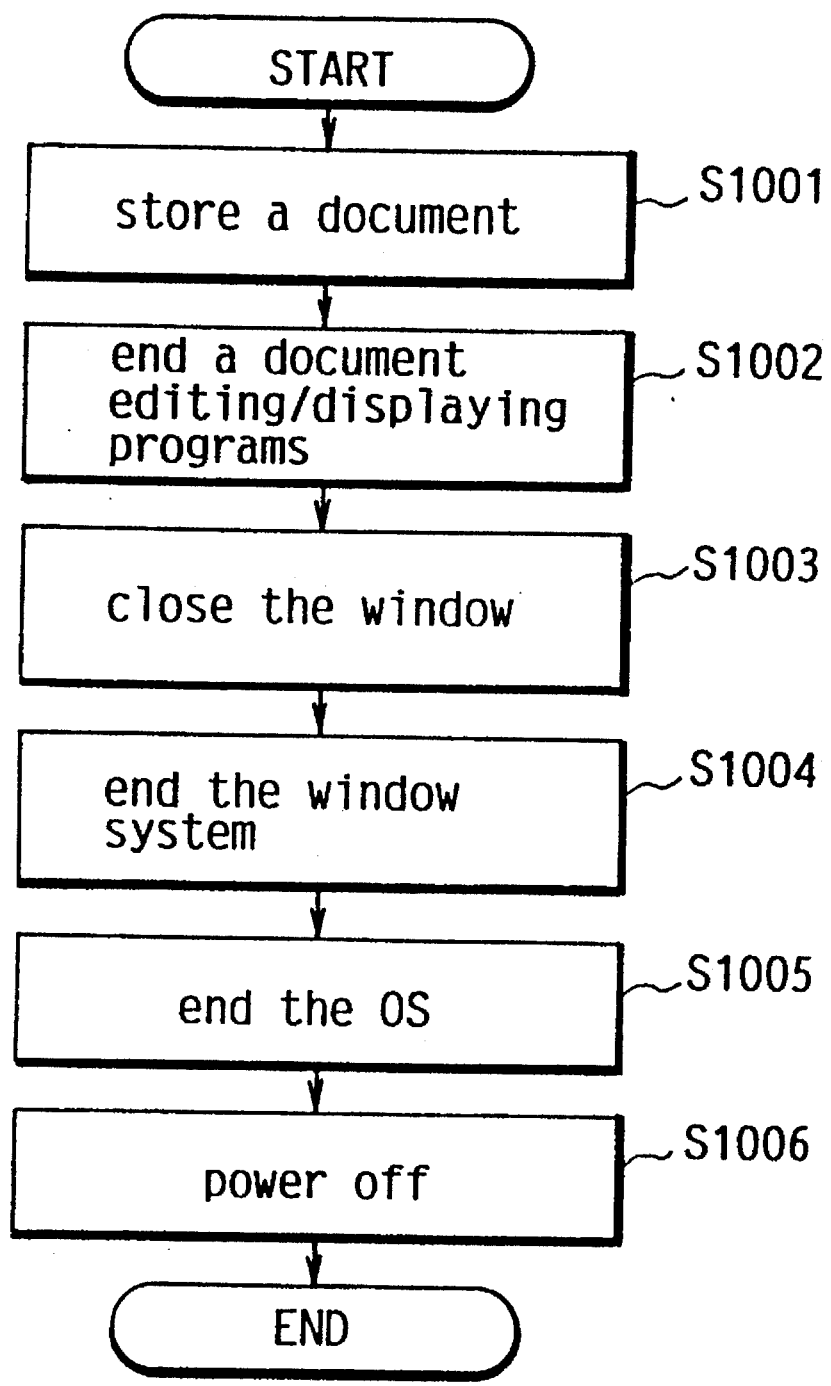
FIG. 12 is a flow chart depicting the operation at the powering off when the system status of Embodiment 1 is not preserved.

As shown in FIG. 12, when the computer system is powered off without saving the system status, it must be returned to the initial status as follows.

To prevent the system status from being preserved at the power off, the power-off processing unit 3001 is exchanged with another unit to direct the power-off controller 105 to output an off-signal without initiating the system status preserving unit 3002. More precisely, the instruction to direct the output of an off-signal or the like may be written in the address area where the execution starts when a power off interruption has occurred.

The application processing unit stores the document in operation to the hard disk drive 114 according to the direction of the user (S1001), and ends the editing process and displaying process of the documents (S1002). At this time, the application program areas 901c/901d are released, and control is passed to the window system processing unit 302.

The unit 302 closes the windows 801 and 802 (S1003) to end the window system process according to the direction of the user (S1004). At this time, the window system area 901b and the window data areas 902a/902b are released, consequently control in transferred to the operating system processing unit.

The operating system processing unit ends the operating system process according to the direction of the user (S1005). At this time, the operating system area 901a is released, the computer system can start only the operating system processing unit according to the direction of the user, and the powering off processing unit 3001 according to the powering off interrupt signal.

Consequently, when the power switch 101 is turned off, the power-off processing unit 3001 sets the value of the resumable flag field 601 to 0 in order to indicate that the system status is not preserved, and directs the power-off controller 105 to output a power-off signal so that the power unit 102 stops power supply.

<Embodiment 2>

Figure 13:
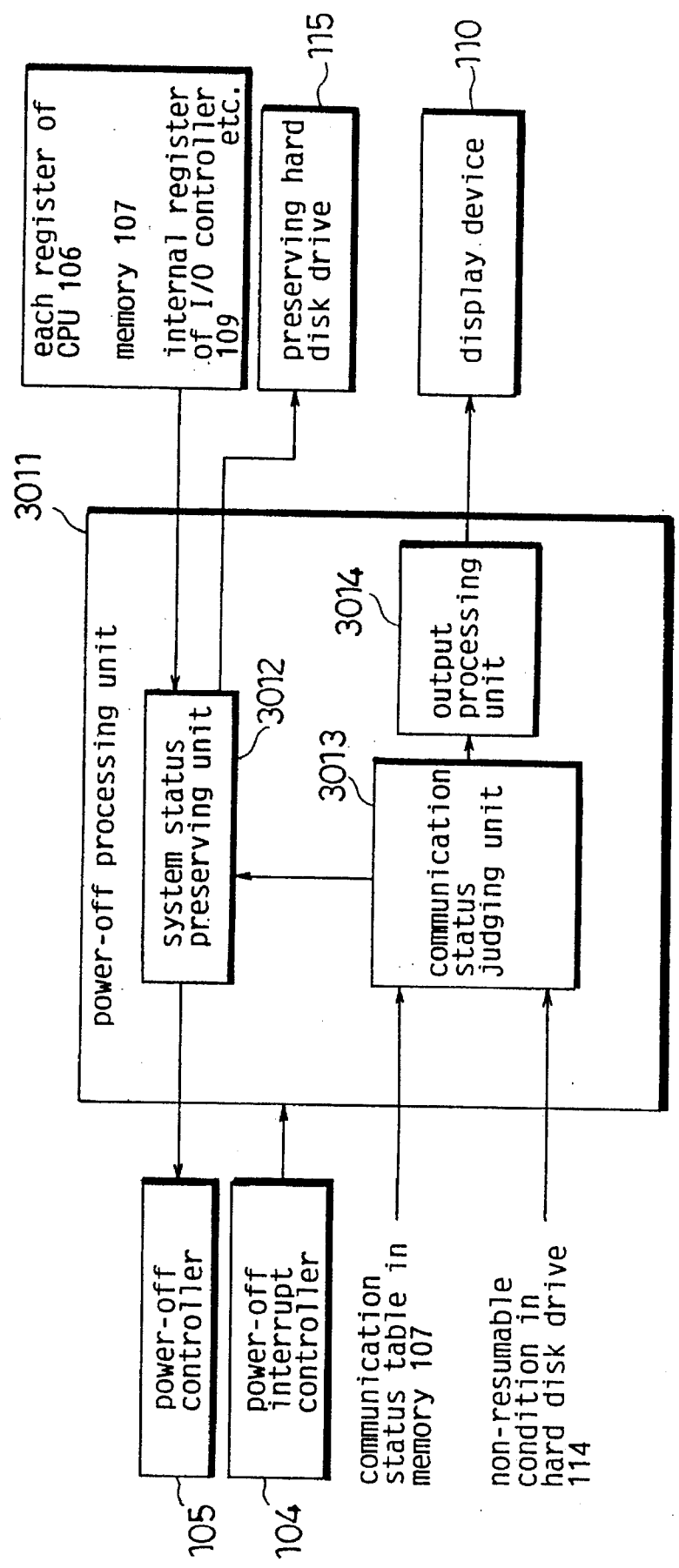
FIG. 13 is a block diagram showing the functional construction of the program routine of Embodiment 2.
Figure 16:
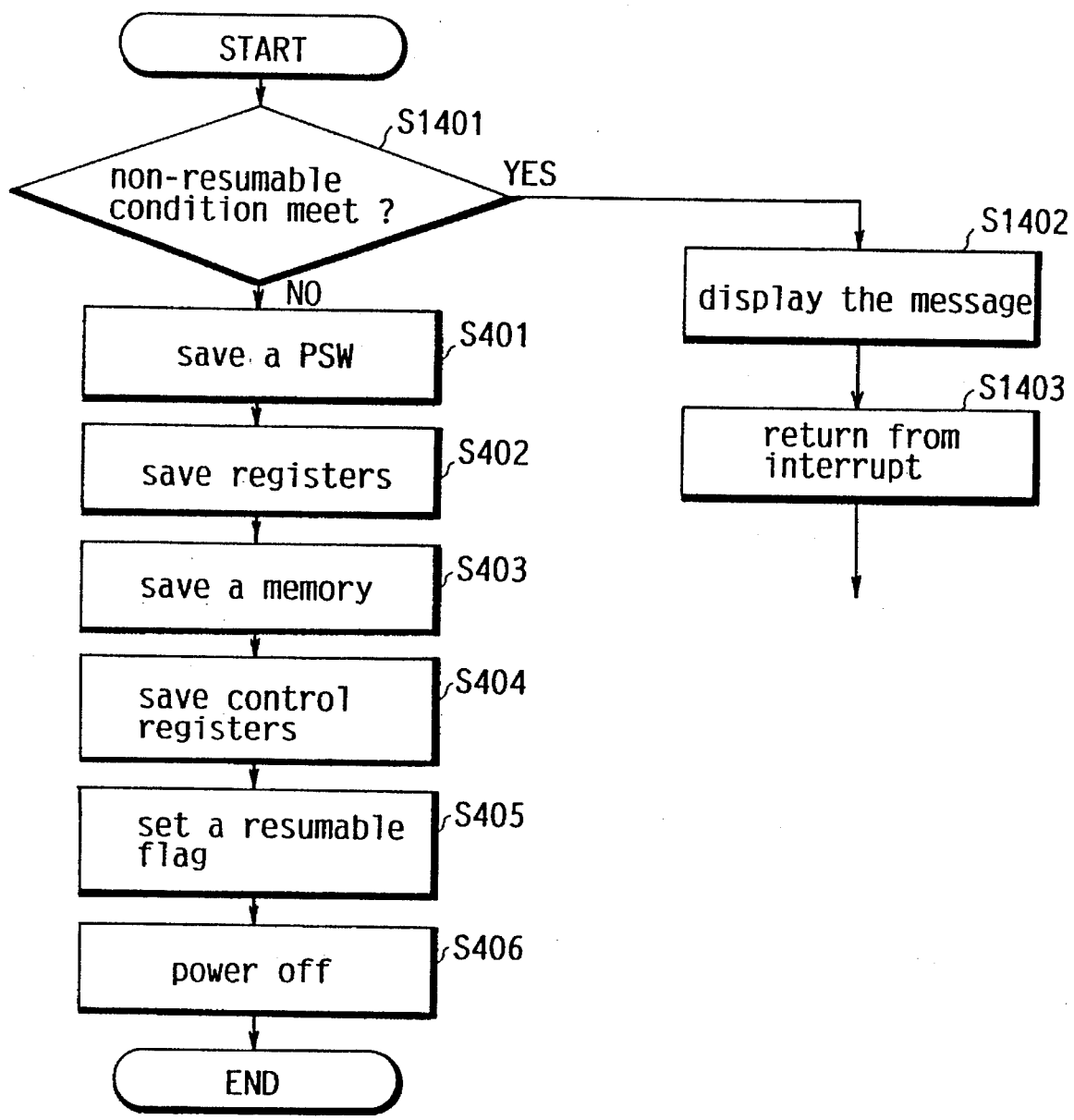
FIG. 16 is a flow chart depicting the operation performed when the power switch of Embodiment 2 has been turned off.

This embodiment differs from Embodiment 1 in the functional construction of a program routine in which a power-off processing unit 3011 shown in FIG. 13 is provided instead of the power-off processing unit 3001.

According to this computer system, when the running program is in the status incapable of returning to the preceding operation, the power supply from the power unit 102 does not stop even the power switch 101 is turned off. A program for communicating with another computer system which is in a specified communication status is included to the above case.

(Detailed Construction of the Power-off Processing Unit 3011)

The power-off processing unit 3011 comprises a communication status judging unit 3013 for judging whether the program is substantially in a non-resumable communication status or not, an output process unit 3014 for displaying the message expressing the incapability of powering off on the display device 110 when the program is in the non-resumable status, and a system status preserving unit 3012 performing the same function as the system status preserving unit 3002 in Embodiment 1 when it is in a resumable communication status.

The communication status judging unit 3013 judges whether powering off should be executed or not based on the communication status table 1200 indicating the communication status of the computer system shown in FIG. 14 and the non-resumable condition 1300 shown in FIG. 15. As a result of this judgement, when it admits the powering off, it starts the system status preserving unit 3012, when it does not, it starts the output processing unit 3014.

(Communication Status Table 1200)

The communication status table 1200 is held in the operating system area 901a of the memory 107. It may be held in the application program area 901c when a communication processing program is started as application program.

The contents of the communication status table 1200 is as follows.

A protocol field 1201 indicates the protocol being used for communication.

A source address field 1202 identifies the computer system of the addressor and the program being processed.

A destination field 1203 identifies the computer system of the addressee and its program.

A connecting condition field 1204 indicates the connecting condition of the programs of the addressor and the addressee, i.e., whether the logical channel has been connected, or is being connected.

For example, the second line of FIG. 14 indicates that the program C running on the computer system X and the program A of the computer system Y are in communication by the connected logical channel in the protocol TCP.

Xs in the first and third lines indicate that a number of windows are opened as each independent virtual terminal, and communication is performed among the application programs initiated on each window. Such a communication can be restarted from the suspended point when the system is powered back on by the contents of the memory 107 being restored because both programs are resumed.

(Non-resumable Condition 1300)

Non-resumable condition 1300 is pre-stored in the hard disk drive 114 or the like. FIG. 15 depicts that when a communication is being processed in which the data in the protocol field 1201 of the table 1200 in a communication status is TCP, the name of the computer system of the destination field 1203 is other than X, and the data indicating the connecting operation in connecting condition field 1204 is "completed", the process can not resumed after power off because the opposite party cancels the communication at the powering off operation.

In the non-resumable condition 1300, the names of the computer system of the source address field 1202 and of the program being processed may be designed to be included.

(The Operation Performed When the Power Switch 101 is Turned Off)

When the power switch is turned off, the power-off processing unit 3011 is started to process interruption like Embodiment 1. The unit 3011 starts the communication status judging unit 3013. The unit 3013 judges whether the program is in a resumable communication status or not by referring to the communication status table 1200 and the non-resumable condition 1300 (S1401).

The communication status judging unit 3013 starts the system status preserving unit 3012 when it is not in non-resumable status. The unit 3012, like the system status preserving unit 3002 in Embodiment 1, processes preserving the system status and the like (S401)–(S405), and is powered off (S406). On the other hand, the unit 3013, when the program is in a non-resumable status, starts the output processing unit 3014 to make the display device 110 display the message expressing the incapability of powering off (S1402), executes a return from interrupt instruction (S1403). Consequently, the computer system returns to the status where it was before the power switch 101 is turned off and the process being executed at that time is resumed.

Thus, the user can know that a non-resumable program is in execution.

This approach can also be applied to the status which is printing procedure, writing/reading to/from the hard disk drive 114, a magneto-optic disk drive, or a magnetic tape drive, or leading to such status by setting specific conditions as the non-resumable condition 1300.

Also, the system status preserving unit 3012 may be designed to wait for the execution of a short procedure such as printing to end up.

<Embodiment 3>

Figure 17:
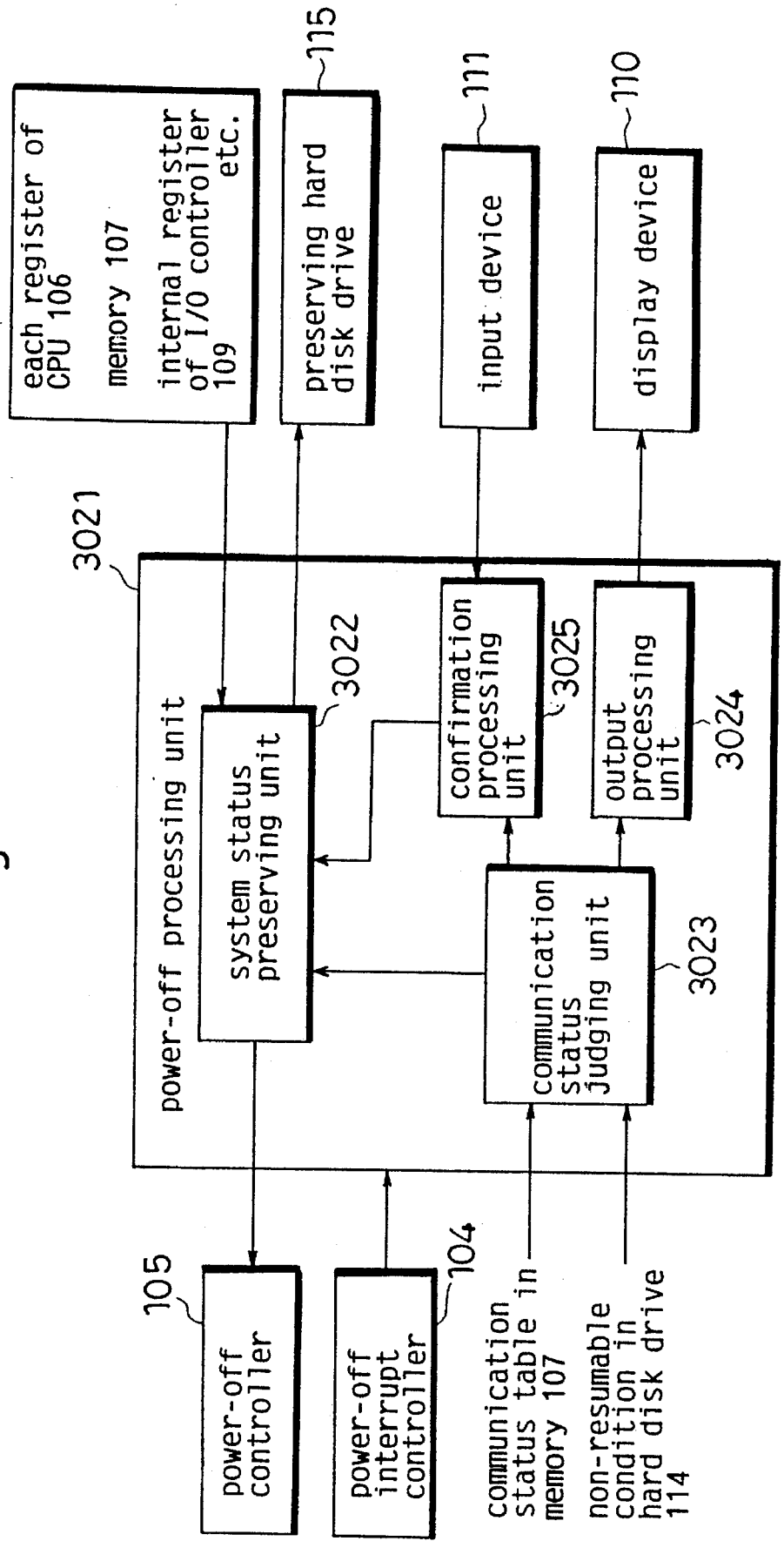
FIG. 17 is a block diagram showing the functional construction of the program routine of Embodiment 3.

This embodiment, like Embodiment 2, differs from Embodiment 1 in the functional construction of program routine in which a power-off processing unit 3021 shown in FIG. 17 is provided instead of the power-off processing unit 3001.

(Detailed Construction of the Power-off Processing Unit 3021)

A system status preserving unit 3022, a communication status judging unit 3023, and an output processing unit 3024 have the same functions as the system status preserving unit 3012, the communication status judging unit 3013, and the output processing unit 3014 respectively except that the unit 3023 starts a confirmation processing unit as well as the output processing unit 3024 when the program is in a substantially non-resumable status.

The confirmation processing unit 3025 starts the system status preserving unit 3022 if the user directs powering off forcibly via the input device 111.

(The Operation Performed When the Power Switch 101 is Turned Off)

Figure 18:
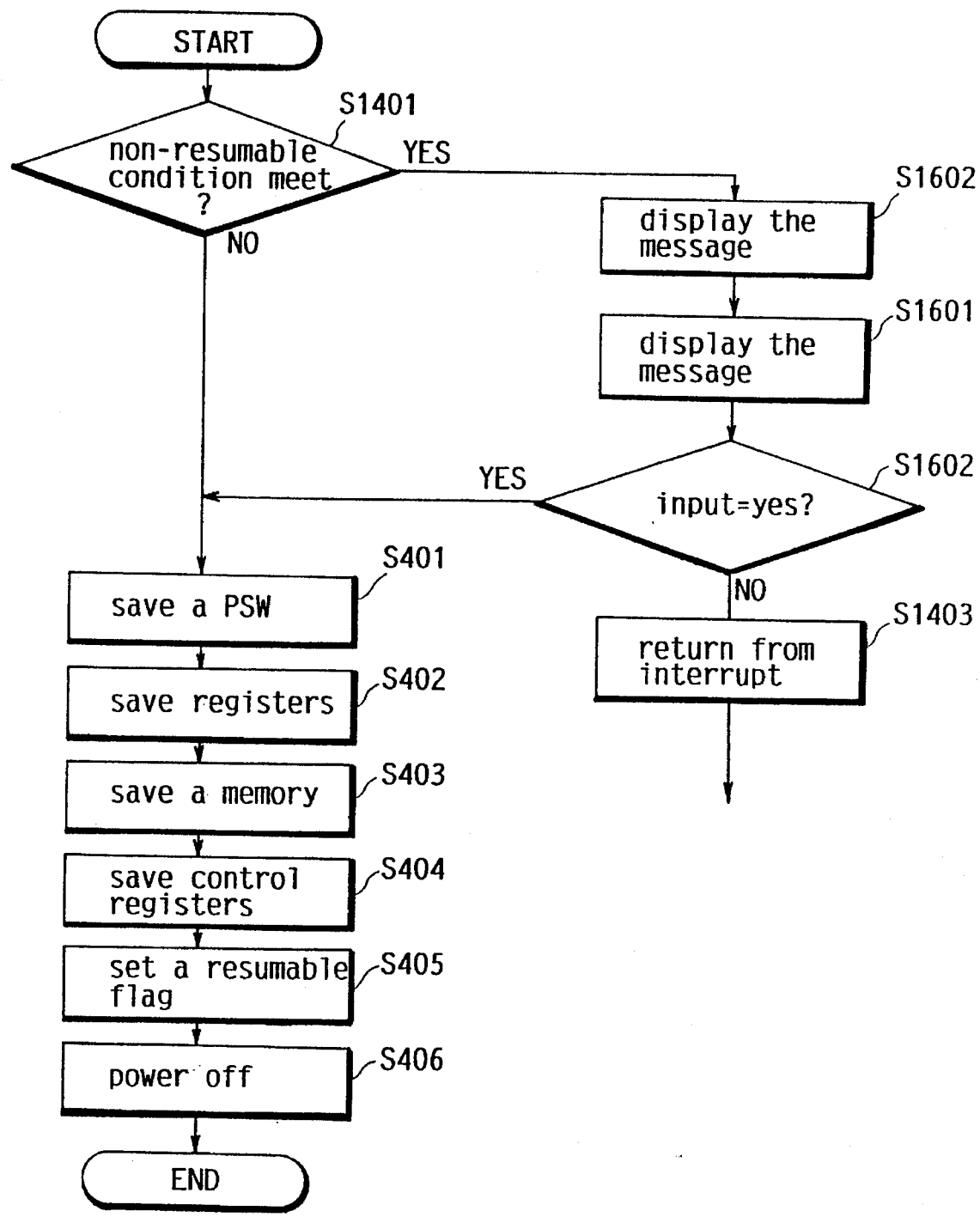
FIG. 18 is a flow chart depicting the operation performed when the power switch of Embodiment 3 has been turned off.

As shown in FIG. 18, if the power switch 101 is turned off, like in Embodiment 2, the communication status judging unit 3023 is started which judges whether the program is in a non-resumable status or not by referring to the communication status table 1200 and the non-resumable condition 1300 (S1401).

The communication status judging unit 3013 starts the system status preserving unit 3012 when the program is not in a non-resumable status. The unit 3012, like the system status preserving unit 3002 of Embodiment 1, performs a process such as preserving of the system status (S401)–(S405), and powers off (S406).

On the other hand, the communication status judging unit 3023 starts the output processing unit 3024 when it is in a non-resumable status. The unit 3024 displays a message that the program is in a non-resumable status on the display device 110 (S1402) and another message to ask the user whether the power is turned off forcibly or not (S1601). The communication status judging unit 3023 starts the confirmation processing unit 3025.

The unit 3025 executes a return from interrupt instruction when the user did not input YES (S1403) to the input device 111, consequently, the computer system returns to the status where it was before the powering off and the program which was running is resumed.

The confirmation processing unit 3025 starts the system status preserving unit 3022 when the user has inputted YES, carry out the process (S401)–(S406), and powers off. The program may be designed to be ended at the time of powering back on in a later time.

Thus, the user can choose between proper processing of a non-resumable program and powering off forcibly when the power switch 101 is turned off.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A computer system wherein an execution of a program can be temporarily suspended in response to a power-off operation and the execution of the program can later be restarted in response to a power-on operation, the computer system comprising:

a power supply means for supplying power comprising an on and off means for selectively supplying power to the computer system;

program execution means for executing the program while the power supply means is turned on and supplying power;

volatile storing means for storing data related to the program being executed by the program execution means only while the power supply means is turned on and supplying power to the computer system;

non-volatile non-electrically maintained storing means for storing the data even when the power supply means is turned off and not supplying power to the computer system;

system status holding means for holding information indicating a status of the computer system;

program execution controlling means for making the program execution means initiate and complete executing the program and for making the system status holding means hold information indicating the status of the computer system corresponding to the execution of the program;

program execution resumption means for making the program execution means resume the program execution when the power supply means is turned on after having been turned off while the program execution means was executing the program;

resumability condition holding means for holding data related to conditions that prohibit the program execution resumption means from resuming the program execution;

resumability judging means for judging whether the computer system is in a resumable or a non-resumable condition based on the data held in the system status holding means when the power supply means is turned off;

non-resumable condition informing means for informing a user when the computer system has been judged to be in the non-resumable condition;

power-off preserving means for transferring the data stored in the volatile storing means to the non-volatile non-electrically maintained storing means in response to a power-off operation when the computer system has been judged to be in a resumable condition by the resumability judging means; and power-on resuming means for returning the data transferred to the non-volatile non-electrically maintained storing means back to the volatile storing means.

2. The computer system of claim 1, wherein the volatile storing means is comprised of a plurality of CPU registers a plurality of input/output control unit registers and a volatile memory.

3. The computer system of claim 1, wherein the non-volatile non-electrically maintained storing means is comprised of a hard disk drive.

4. The computer system of claim 1, wherein the non-volatile non-electrically maintained storing means is comprised of an electrical erasable programmable read-only memory.

5. The computer system of claim 1, wherein the non-volatile non-electrically maintained storing means is comprised of a magneto-optic disk drive.

6. The computer system of claim 1, further comprising:

a power switch for selectively outputting an ON signal and an OFF signal according to an operation of the power switch by a user; and interrupt control means for directing the resumability judging means to judge whether the computer system is in the resumable condition or the non-resumable condition in response to the OFF signal from the power switch.

7. The computer system of claim 1, further comprising:

a power switch for selectively outputting an ON signal and an OFF signal according to an operation of the power switch by a user; and power-on reset means for immediately turning on the power supply to supply power to the computer system in response to the ON signal and for directing the power-on resuming means to return the data transferred to the non-volatile non-electrically maintained storing means back to the volatile storing means.

8. The computer system of claim 1, further comprising:

power-off non-preserving means for turning off the power supply without transferring the data stored in the volatile storing means to the non-volatile non-electrically maintained storing means; and power-off operation selecting means for selecting one of the power-off preserving means and the power-off non-preserving means according to a selection of a user, wherein the power-off preserving means sets a preserving flag in the non-volatile non-electrically maintained storing means indicating that the data held in the volatile storing means has been transferred, and wherein the power-on resuming means returns the data in the non-volatile non-electrically maintained storing means back to the volatile storing means only when it has detected the preserving flag.

9. A computer system wherein an execution of a program can be suspended and restarted in response to power-on and power-off operations, respectively, the computer system comprising:

a power supply means for supplying power comprising an on and off means for selectively supplying power to the computer system;

volatile storing means for storing data related to a program being executed by the computer system only while the power supply means is turned on and supplying power to the computer system;

non-volatile non-electrically maintained storing means for storing the data even when the power supply means is turned off and not supplying power to the computer system;

system status holding means for holding information indicating a status of the computer system;

program execution controlling means for controlling initiation and completion of the program execution and for making the system status holding means hold information indicating the status of the computer system corresponding to the program execution;

resumability condition holding means for holding data related to conditions that prohibit resumption of the program execution when the power supply means is turned on after having been turned off during the program execution;

resumability judging means for judging whether the computer system is in a resumable or a non-resumable condition based on the data held in the system status holding means when the power supply means is turned off;

non-resumable condition informing means for informing a user when the computer system has been judged to be in the non-resumable condition by the resumability judging means;

power-off preserving means for transferring the data stored in the volatile storing means to the non-volatile non-electrically maintained storing means in response to a power-off operation when the computer system has been judged to be in a resumable condition by the resumability judging means; and power-on resuming means for returning the data transferred to the non-volatile non-electrically maintained storing means back to the volatile storing means in response to a power-on operation.

10. The computer system of claim 9, wherein the system status holding means holds information indicating a communication status of the computer system, and the resumability condition holding means holds data related to the non-resumable condition of the computer system being in communication with another computer system.

11. The computer system of claim 9, wherein the system status holding means holds information indicating a printing operation of the computer system, and the resumability condition holding means holds data related to the non-resumable condition of the printing being in operation.

12. The computer system of claim 9, wherein the system status holding means holds information indicating an access to at least one of a hard disk drive, a floppy disk drive, magneto-optic disk drive, and a magnetic tape drive; and the resumability condition holding means holds data related to the non-resumable condition of the access.

13. The computer system of claim 9, wherein the system status holding means holds information indicating a predetermined program is in operation; and the resumability condition holding means holds data related to the non-resumable condition of the predetermined program being in operation.

14. The computer system of claim 9 further comprising:

power-off direction canceling means for canceling a power-off direction when the computer system has been judged to be in the non-resumable condition by the resumability judging means.

15. The computer system of claim 9, further comprising:

power-off direction confirming means for confirming whether the user wants to power off even when the computer system has been judged to be in the non-resumable condition by the resumability judging means, for powering off when the user does want to power off, and for canceling a power off direction when the user does not want to power off.

* * * * *